United States Patent [19]

Karwat

[11] Patent Number: 4,609,389
[45] Date of Patent: Sep. 2, 1986

[54] PROCESS FOR SCRUBBING GASEOUS COMPONENTS OUT OF GASEOUS MIXTURES

[75] Inventor: Heinz Karwat, Pullach, Fed. Rep. of Germany

[73] Assignee: Linde Aktiengesellschaft, Wiesbaden, Fed. Rep. of Germany

[21] Appl. No.: 683,096

[22] Filed: Dec. 18, 1984

[30] Foreign Application Priority Data

Dec. 20, 1983 [DE] Fed. Rep. of Germany ....... 3346038

[51] Int. Cl.$^4$ ............................................... F25J 3/00
[52] U.S. Cl. ......................................... 62/17; 62/28; 55/68; 55/73
[58] Field of Search ............ 55/48, 68, 73; 62/17, 62/28

[56] References Cited

U.S. PATENT DOCUMENTS

| 3,718,006 | 2/1973 | Ranke et al. | 62/17 |
| 3,886,757 | 6/1975 | McClintock et al. | 62/17 X |
| 4,332,596 | 6/1982 | Ranke et al. | 55/73 X |
| 4,381,926 | 5/1983 | Karwat | 55/48 |

Primary Examiner—Charles Hart
Attorney, Agent, or Firm—Millen & White

[57] ABSTRACT

Gaseous components are scrubbed from gaseous mixtures with a physical solvent; the latter, after absorption of the scrubbed-out gaseous components, is regenerated by expansion and stripping, wherein the gaseous fraction being released is discharged and the regenerated solvent is recycled into the scrubbing step. To reduce the content of solvent vapors in the gases to be exhausted into the atmosphere, the released gaseous fraction is cooled in heat exchange with non-thermally degasified solvent in order to condense out entrained solvent vapors from the gaseous fraction.

8 Claims, 1 Drawing Figure

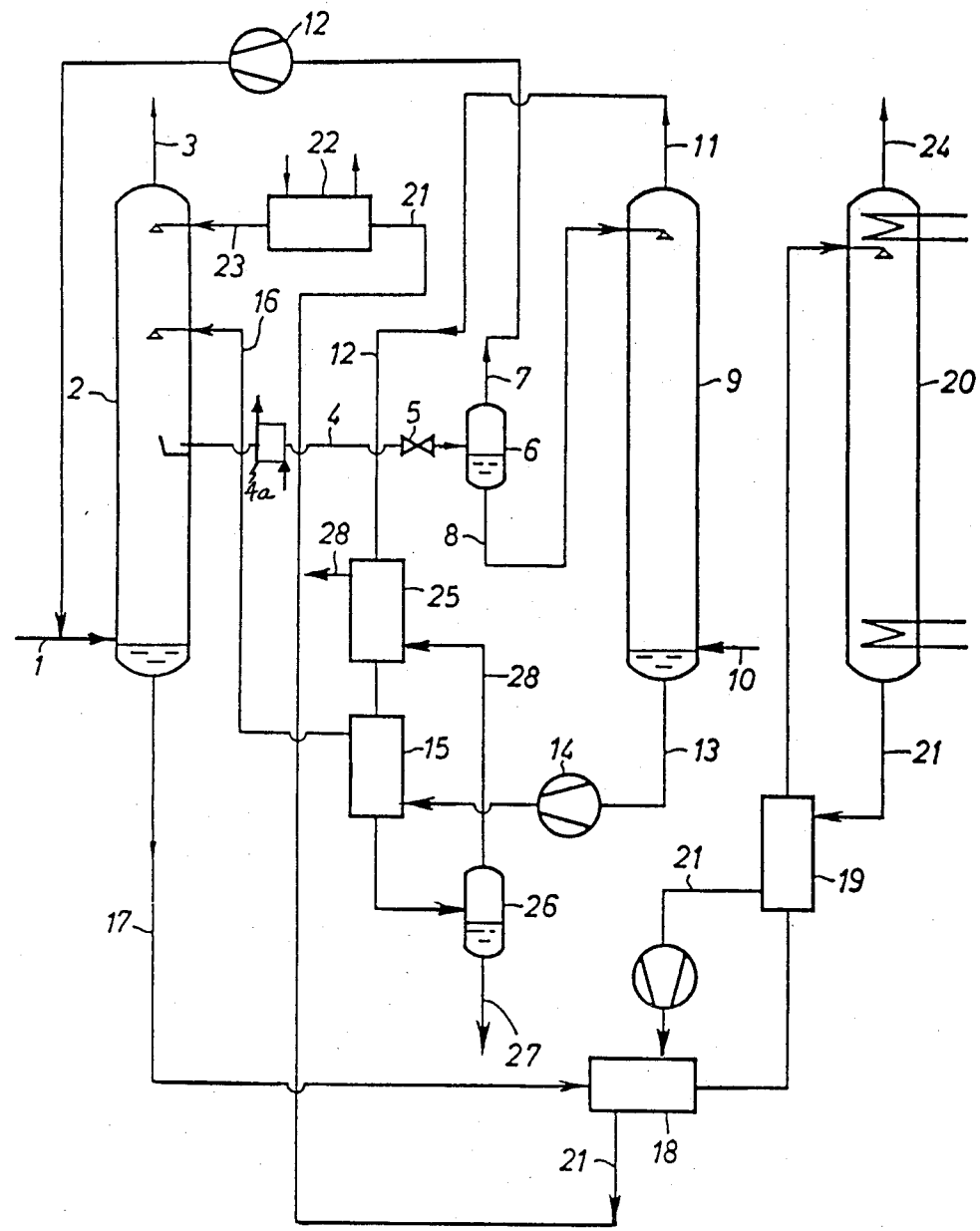

PROCESS FOR SCRUBBING GASEOUS COMPONENTS OUT OF GASEOUS MIXTURES

BACKGROUND OF THE INVENTION

The invention relates to a process for scrubbing out gaseous components from gaseous mixtures with a physical solvent which is regenerated by expansion and stripping and in particular wherein the gaseous fraction from the stripping step is discharged and the resultant regenerated solvent is recycled to the scrubbing step.

It is old to utilize physical solvents for the purification of gases, e.g., synthesis raw gases containing $CO_2$, COS, and $H_2S$, or of cracked gases of acetylene. Since the absorption capacity of the physical solvents, such as methanol, for example, for the gaseous components to be scrubbed out increases with decreasing temperature, these scrubbing operations are conducted at as low a temperature as economically and technically feasible. In this connection, with the use of methanol, the scrubbing temperatures are considerably below 0° C., e.g., generally at about $-5$ to $-65°$ C. Regeneration of the physical solvent loaded with the scrubbed-out gaseous components is conventionally conducted in a combination of pressure reduction and/or stripping and/or thermal regeneration steps. In this regeneration process, the absorbed gaseous components are released and the regenerated solvent is recycled into the scrubbing step.

Among the thus-released gases, $CO_2$ and $N_2$, the latter is generally utilized as the stripping gas, and can be discharged, for example, directly into the atmosphere. However, this gaseous fraction still contains in all instances a proportion of concomitantly driven-out solvent vapors. This solvent content of the gases leaving the scrubbing step is dependent on the temperature and pressure at which the gases are separated from the liquid solvent. According to presently enforced regulations to prevent atmospheric pollution, the expulsion of solvent vapors must not exceed a content dependent on the respective type of solvent. For this reason, it has been suggested to subject the gases to be discharged into the atmosphere to an additional purifying process, for example a water scrub or an adsorption procedure, in order to lower the solvent content in the gas. However, separation of the solvent from water, or regeneration of the adsorber requires a considerable expenditure in energy and apparatus.

SUMMARY OF THE INVENTION

An object of one aspect of this invention is to provide a process of the type described above in such a way that the content of solvent vapors of the gases to be discharged into the atmosphere is reduced in a simple and economical fashion.

An object of another aspect of this invention is to provide apparatus for the process.

Upon further study of the specification and appended claims, further objects and advantages of this invention will become apparent to those skilled in the art.

These objects are attained according to the invention by cooling the gas fraction being released in heat exchange with non-thermally degasified solvent and condensing out entrained solvent vapors from the gaseous fraction.

The process of this invention makes it possible, for example, to meet the requirements of air pollution regulatory laws. Also, by virtue of this invention, it is possible to avoid the use of the water scrub column or the adsorbers of the conventional process, as well as steam for the separation of a solvent-water mixture, or the energy input required for adsorber regeneration.

The refrigeration required for the cooling step is made available by heat exchange with non-thermally degasified solvent, i.e., by heat exchange with cold-stripped or pressure-reduced solvent, namely solvent from which the absorbed gaseous components have been removed without supplying external heat. This measure is especially useful in cases where the scrubbing step is not followed by a low-temperature facility, for example a scrubbing process with liquid nitrogen to obtain $NH_3$ synthesis gas, where the necessary cold demand could otherwise be available.

It is especially advantageous to cool the gaseous fraction to temperatures close to the melting point of the solvent. Particularly with the use of methanol, it proved to be advantageous to effect cooling to temperatures of $-50°$ C. to $-97°$ C., preferably $-60°$ C. to $-85°$ C. The lower temperature limit of $-85°$ C. is preferred because at even lower temperatures, the increased viscosity of the methanol becomes undesirable.

It is thereby made possible to cool close to the $CO_2$ dew point so that hardly any methanol will remain in the gas to be discharged.

The lowest temperatures can be attained by the use of pressure reduction, e.g., vacuum—for the replacement or saving of stripping gas.

In a further development of the process aspect of this invention, it is provided that a maximum methanol content of 300 mg/$Nm^3$ is set in the gaseous fraction being released. This level is attained by proper cooling of the gaseous fraction, under the particular gas pressure involved.

According to a still further development of the process aspect of this invention involving the scrubbing of a gas containing $CO_2$ and $H_2S$, it is contemplated where $CO_2$ and $H_2S$ are absorbed that the loaded scrubbing liquid be obtained as two fractions, with one fraction being treated by a non-thermal degasification process to desorb $CO_2$, and the other fraction being treated by a thermal degasification process to desorb $H_2S$.

The proportion of non-thermally and thermally regenerated methanol is determined by the relative amounts of dissolved $CO_2$ and $H_2S$ in methanol. The very low temperature level reached is obtained by the relative quantity of $CO_2$ evaporating from methanol.

The invention moreover relates to an apparatus for conducting the process with a scrubbing column and non-thermal degasifying means, e.g., an expansion and/or stripping facility arranged downstream thereof, said degasifying means comprising an inlet for solvent loaded with scrubbed-out gaseous components and an outlet for regenerated solvent, as well as a discharge conduit for the gaseous fraction being released. This apparatus is characterized in that at least one heat exchanger is arranged in the discharge conduit, and that the heat exchanger is in heat exchange communication with the outlet for regeneration solvent from the non-thermal degasification means.

The process of this invention can be utilized for depleting all gaseous fractions of solvent vapors to avoid solvent losses, such as in the process involving the removal of the $H_2S$ fraction or the acetylene fraction from a cracked gas, which solvent vapors are not to be discharged into the atmosphere, or wherein recovered gas components to be used for further processing, must be free of solvent vapors. Especially in the case of the $H_2S$ fraction, cooling to less low temperatures is sufficient because this fraction is treated in a Claus plant where higher amounts of methanol can be tolerated than in gases being exhausted into the atmosphere.

As further fractions, the $CO_2$ fraction from the expansion step and the $CO_2/N_2$ fraction frm the stripping step can also be depleted of solvent vapors. The process, in this connection, is applicable in case of all physical solvents, especially those of a high vapor pressure, such as, for example, methanol, ethanol, acetone, dimethylformamide, N-methylpyrrolidone.

BRIEF DESCRIPTION OF THE DRAWING

The attached drawing is a schematically illustrated preferred embodiment comprehensive of the present invention.

DETAILED DESCRIPTION OF THE DRAWING

At 1, 10,000 $Nm^3/h$ of crude gas to be purified enters into a methanol scrubbing column 2 with a temperature of $-20°$ C. and under a pressure of 40 bar. The crude gas consists essentially of $H_2$, CO, and $CO_2$, but also contains COS and $H_2S$. In the scrubbing column 2, in the lower portion thereof, the sulfur compounds are scrubbed out with a partial quantity of methanol. In the central section of the scrubbing column 2, the rough $CO_2$ scrubbing step takes place, using the main quantity of methanol, and the fine purification is performed in the upper section. The scrubbing step is carried out in the central section of scrubbing column 2 with partially regenerated methanol, in the upper section with completely regenerated methanol. The purified gas is discharged via a conduit 3, optionally in order to precool the crude gas to be purified, and then is passed on to further treatment.

The $CO_2$-loaded methanol, after optional supercooling in cooler 4a, e.g., an ammonia cooler, is expanded via conduit 4 with valve 5 into a separator 6. During expansion, the main quantity of the $H_2$ and CO, dissolved in the methanol, is released together with a small portion of the dissolved $CO_2$ and flows via conduit 7 from separator 6 to a recycle compressor 12 and back into the crude gas. The methanol, still loaded with $CO_2$, is introduced from separator 6 via a conduit 8 into a regenerating column 9 and freed therein of $CO_2$ by stripping with a stripping gas, e.g. $N_2$, supplied via conduit 10. The thus-liberated gases, primarily $CO_2$ and the nitrogen, are removed from column 9 overhead via the discharge conduit 11. The $CO_2$-depleted methanol is again pumped at 14 to the pressure of the scrubbing column conduit 13 and, after partial heating in a heat exchanger 15, is returned into column 2 and introduced into the central section thereof as partially regenerated methanol via conduit 16.

The methanol, containing $H_2S$ and $CO_2$, collecting in the sump of scrubbing column 2 passes via conduit 17 and an intermediate expansion stage, not shown herein, which is analogous to 5, 6, and via heat exchangers 18 and 19 into a thermal-regenerating column 20. In heat exchanger 18, the methanol is heated to approximately ambient temperature, in heat exchanger 19 to about 65° C. In regenerating column 20, the methanol is completely degasified by boiling. The thus-regenerated methanol is withdrawn from the sump of the hot-regenerating column 20 via conduit 21, cooled in heat exchangers 19 to 30° C. and 18 to $-10°$ C. After another cooling step to about $-40°$ C. in a refrigerant vaporizer 22, the methanol is returned to the scrubbing column 2 and is introduced to the upper section thereof via conduit 23 as completely regenerated methanol. The $H_2S$ and $CO_2$ fraction liberated in the thermal-regenerating column 20 exits via conduit 24 from the head of column 20 and can be further treated to obtain elemental sulfur.

The gases in the discharge conduit 11 contain about 2 $g/Nm^3$ of methanol vapor. It is desired, however, that the methanol content not exceed 300 $mg/Nm^3$. Therefore, the provision is made in accordance with the invention to treat the gases to be exhausted into the atmosphere by heat exchange with cold, non-thermally regenerated methanol. For this purpose, the gases are cooled in a heat exchanger 15 against cold-stripped methanol to $-67°$ C. (30° C. higher than the melting point of methanol) and introduced into a separator 26. In this separator, the condensed methanol is collected and withdrawn via conduit 27, and is recycled into the methanol cycle. The gaseous fraction, at this point freed almost entirely of methanol, leaves the separator 26 after partial heating by heat exchanger 25 via conduit 28. The resultant gas is then warmed to approximately ambient temperature against crude gas in a heat exchanger not shown herein, and is the exhausted into the atmosphere.

The preceding embodiments can be repeated with similar success by substituting the generically or specifically described reactants and/or operating conditions of this invention for those used in the preceding embodiments.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for scrubbing gaseous components from gaseous mixtures comprising scrubbing the gaseous mixture with a physical solvent, regenerating resultant loaded solvent by a process comprising subjecting at least a fraction of the loaded solvent to non-thermal degasification to obtain a gaseous fraction and regenerated solvent, and recycling the regenerated solvent into the scrubbing step, the improvement which comprises cooling said discharged gaseous fraction in heat exchange with non-thermally degasified regenerated solvent at sufficiently low temperatures to condense out entrained solvent vapors from the gaseous fraction.

2. A process according to claim 1 wherein the solvent is methanol and the cooling step is conducted at temperatures of $-50°$ C. to $-97°$ C.

3. A process according to claim 1 wherein the solvent is methanol and the cooling step is conducted at temperatures of $-60°$ C. to $-85°$ C.

4. A process according to claim 3, the resultant gaseous fraction having not more than 300 $Nm^3$ of methanol.

5. A process according to claim 1 wherein the non-thermal degasification comprises expansion and/or stripping.

6. A process as claimed in claim 1, wherein said process further comprises regenerating a fraction of the loaded solvent by thermally expanding and then thermally regenerating the loaded solvent.

7. A process as claimed in claim 1, wherein said condensed out entrained solvent vapors from the gaseous fraction are further recovered and recycled to the scrubbing step.

8. A process as claimed in claim 1, wherein said discharged gaseous fraction, after the solvent vapors are condensed, is separated from the condensate and is heated in heat exchange with said discharged gaseous fraction, and is then released into the atomosphere.

* * * * *